US010832223B2

(12) United States Patent
Kumar et al.

(10) Patent No.: US 10,832,223 B2
(45) Date of Patent: Nov. 10, 2020

(54) AUTOMATIC REMOTE COMMUNICATIONS SESSION CREATION

(71) Applicant: Microsoft Technology Licensing, LLC, Redmond, WA (US)

(72) Inventors: Michael J. Kumar, Seattle, WA (US); Shahil Soni, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 15/805,899

(22) Filed: Nov. 7, 2017

(65) Prior Publication Data

US 2019/0139002 A1    May 9, 2019

(51) Int. Cl.
  *G06Q 10/00* (2012.01)
  *G06Q 10/10* (2012.01)
  *H04L 29/06* (2006.01)
  *G06Q 10/06* (2012.01)

(52) U.S. Cl.
  CPC ..... *G06Q 10/1095* (2013.01); *G06Q 10/0631* (2013.01); *H04L 65/1069* (2013.01); *H04L 65/403* (2013.01)

(58) Field of Classification Search
  None
  See application file for complete search history.

(56) References Cited

U.S. PATENT DOCUMENTS

| 8,073,725 | B2 * | 12/2011 | Loring | G06Q 10/107 705/7.18 |
| 8,121,953 | B1 * | 2/2012 | Orttung | G06Q 10/1095 705/35 |
| 8,190,679 | B1 * | 5/2012 | Gay | H04L 67/34 709/204 |
| 8,548,836 | B2 * | 10/2013 | Draper | G06Q 10/063 705/7.11 |
| 8,655,714 | B2 * | 2/2014 | Weir | G06Q 10/109 705/7.18 |
| 10,127,188 | B2 * | 11/2018 | Bastide | G06F 9/451 |
| 10,235,329 | B2 * | 3/2019 | Bastide | G06F 15/0266 |
| 10,394,750 | B2 * | 8/2019 | Bastide | G06F 3/0482 |

(Continued)

OTHER PUBLICATIONS

The More Efficient Way to Schedule Meetings, Aug. 3, 2016, Maura Thomas, https://maurathomas.com/productivity/efficient-way-schedule-meetings/, p. 1-8.*

(Continued)

*Primary Examiner* — Joseph M Waesco
(74) *Attorney, Agent, or Firm* — Schwegman Lundberg & Woessner, P.A.

(57) ABSTRACT

Disclosed in some examples are methods, systems, and machine-readable media that reserve remote meeting resources and update meetings with remote meeting connection information in response to a user indicating an availability status that signifies that the user is away from a location of the meeting. In response to this indication, the system interfaces with the user's calendar and searches for in-person meetings for the period in which the user is out of the office. For in-person meetings that are found, the system may automatically schedule remote meeting resources for a remote meeting session and update in-person meetings with remote meeting connection information.

22 Claims, 8 Drawing Sheets

(56) References Cited

U.S. PATENT DOCUMENTS

| | | | | |
|---|---|---|---|---|
| 2004/0249776 | A1* | 12/2004 | Horvitz | G06Q 10/109 706/21 |
| 2005/0198321 | A1* | 9/2005 | Blohm | G06Q 10/00 709/228 |
| 2005/0273372 | A1* | 12/2005 | Bowne | G06Q 10/10 705/5 |
| 2006/0224427 | A1* | 10/2006 | Salmon | G06Q 10/02 705/7.22 |
| 2008/0032703 | A1* | 2/2008 | Krumm | H04W 4/029 455/456.1 |
| 2008/0133282 | A1* | 6/2008 | Landar | G06Q 10/1095 705/5 |
| 2009/0055234 | A1* | 2/2009 | Li | G06Q 10/109 705/7.24 |
| 2009/0119246 | A1* | 5/2009 | Kansal | G06F 16/48 |
| 2009/0187454 | A1* | 7/2009 | Khasin | G06Q 10/109 705/7.19 |
| 2014/0237041 | A1* | 8/2014 | Bhat | H04L 65/1069 709/204 |
| 2014/0379404 | A1* | 12/2014 | Bastide | G06Q 10/1095 705/7.19 |
| 2015/0149540 | A1* | 5/2015 | Barker | H04L 12/1827 709/204 |
| 2018/0077099 | A1* | 3/2018 | Silva | H04L 51/16 |
| 2019/0108492 | A1* | 4/2019 | Nelson | G10L 15/265 |
| 2019/0108493 | A1* | 4/2019 | Nelson | G06F 40/186 |

OTHER PUBLICATIONS

"International Search Report and Written Opinion issued in PCT Application No. PCT/US2018/058309", dated Dec. 19, 2018, 13 Pages.

* cited by examiner

AUTOMATIC REMOTE COMMUNICATIONS SESSION CREATION

BACKGROUND

Network-based communication applications provide one or more communication features such as Voice over Internet Protocol (VoIP) communications, telephone conference call integration, document sharing, video conferencing, instant messaging, and the like. Example network-based communication applications may include Microsoft SKYPE®, Microsoft TEAMS®, SLACK®, Google HANGOUTS®, BLUEJEANS®, ZOOM®, and others. These communication applications may provide the ability to have remote meetings whereby one or more participants are in a different physical location from one or more other participants.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
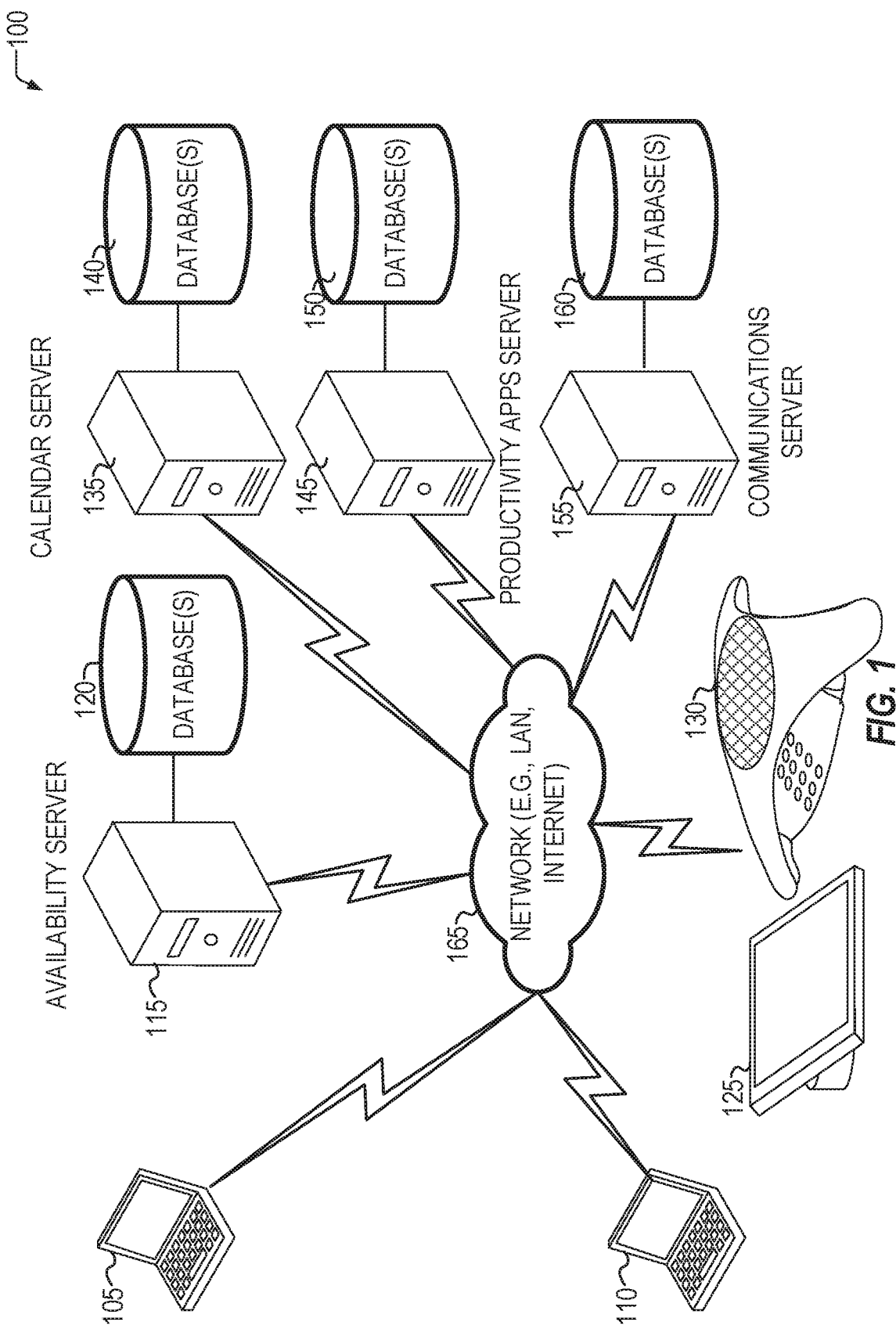
FIG. 1 illustrates a system for remote meetings and presence information according to some examples of the present disclosure.

The interactivity provided by network-based communication applications has allowed remote meetings to be as effective as in-person physical meetings. This, in turn, has increased the flexibility of work arrangements for employees—allowing employees to be away from the office (e.g., at home) and yet be available for collaborative meetings. Nevertheless, a remote meeting may need to be setup and participants need connection information to connect to these collaboration sessions. For example, remote meeting resources such as server resources, voice lines, and other communication resources may need to be scheduled in advance. Furthermore, remote meeting connection information that allows participants to join the meeting such as a link, a telephone number, and the like need to be provided to participants.

Typically a person scheduling a meeting would find out the availability of the participants and schedule the right resources including any remote meeting resources at the time of scheduling. After the meeting is scheduled, changes to availability—such as when a user decides to work from home may require meeting organizers to modify resources. For example, if the meeting was strictly an in-person meeting without any remote meeting resources, the meeting organizer may need to schedule remote meeting resources and modify the meeting invitation with the remote meeting connection invitation. In addition, the meeting organizer may need to modify physical room reservations. For example, if the meeting organizer reserved a room that does not support remote meetings. In addition, it may be beneficial to change rooms if the number of in-person participants is now fewer than an optimal amount of persons for the room in order to free up the room for another meeting.

Users that wish to work from home or are away from the office may have many meetings during the course of the day and have to contact the meeting organizer which may be time consuming and cumbersome. This limits the flexibility that employees have in deciding when and whether to work from home; specifically, last minute changes of plans may cause the user undesired hassle.

Disclosed in some examples are methods, systems, and machine-readable mediums that reserve remote meeting resources and update meetings with remote meeting connection information in response to a user indicating an availability status that signifies that the user is away from a location of the meeting. For example, the user may set an availability status indicating they are working from home or otherwise unavailable for an in-person meeting (e.g., in a different physical location than the planned meeting). In response to this indication, the system (e.g., system 100 in FIG. 1) interfaces with the user's calendar and searches for in-person meetings for the period in which the user is out of the office.

For in-person meetings that are identified, the system may automatically schedule remote meeting resources for a remote meeting session and update in-person meetings with remote meeting connection information. In some examples, the meeting is automatically updated with the connection information and the organizer and/or participants may be automatically notified. In some examples, prior to automatically updating the in-person meetings, the system may notify the meeting organizer and obtain approval for the system to update the meeting and contact the participants.

In addition, in some examples, if there are individuals that will be physically present in one or more conference rooms, the selection of the conference room, as well as any resources booked for those conference rooms (e.g., audio visual resources) may be checked and suggested changes may be sent to the meeting organizer. In some examples, the suggested changes may be automatically made. For example, the room may be bigger than is needed, additional audiovisual equipment may be needed, and the like. In some examples, conference room computing equipment may be configured with the remote meeting connection information. In some examples, the conference room computing equipment may automatically begin or join the remote meeting session given the remote meeting connection information at the scheduled time.

The disclosed methods improve the functioning of a computing device or system, such as a server, a mobile phone, a personal computer, and the like by addressing the technical problem of synchronizing between user availability data objects in an availability server, remote meeting data objects in a remote communication server, and meeting data objects in a calendar server. One example technical solution finds and modifies in-person meeting data structure objects in a calendar data store of a user, such as a calendar server in which the user is a participant in the meetings so as to update those in-person meetings with remote meeting connection information created in a remote communication server responsive to receipt of a user availability data object. For example, the user's computing device, or an availability server may interface with a calendar data store (e.g., a calendar server) to discover in-person meetings. For discovered in-person meetings the system may interface with a communication service to create remote meetings. The system may then synchronize the in-person meetings with the remote meetings scheduled in the communication service. Additional technical aspects include creating one or more user interfaces to facilitate the entering of a status that indicates the user is not available for an in-person meeting. Furthermore, it can be appreciated that the present solutions provide the user with an ability to update a meeting as a result of a status update—whereas previously the user may not have been able to update meeting information of a meeting in which they were not the organizer.

Turning now to FIG. 1, an example system 100 for remote meetings and presence information is shown according to some examples of the present disclosure. User computing devices 105 and 110 may run one or more communications applications which may communicate over network 165 with communications server 155. Network 165 may be, or include one or more of: a local area network (LAN), a Wide Area Network (WAN), a cellular network, the Internet, or the like. Communications between various components of FIG. 1 and various other components may be wired, wireless, or a combination of wired and wireless.

Communications server 155 hosts one or more remote meeting sessions. A remote meeting may be any meeting in which at least one participant is in a different location than at least one other participant, and wherein the communication between the two participants is facilitated through a communications application, a computer network, and computing devices. A remote meeting session may be an instance of a remote meeting and may comprise one or more assigned communication resources (e.g., voice lines, server resources, and the like), one or more user participants, connection information that allows user participants to join the meeting, and the like. Information about a scheduled remote meeting may be stored as a remote meeting data structure object in a database 160 that is communicatively coupled to the communications server 155. In other examples, information about scheduled meetings may be stored at one of the user computing devices 105, 110.

In an example, communications server 155 may relay communications between participants in a remote meeting. For example, in FIG. 1, the communications server 155 may relay communications embedded in communication packets from users of computing device 105 to computing device 110, conference room equipment 125, and 130. Similarly, communications from users of computing device 110 may be relayed to computing device 105, conference room equipment 125, and 130. Communications from users of conference room equipment 125, and 130 may be relayed to users of computing device 105, 110. Communications server 155 may implement VoIP, bridge a user dialed into a conference call number from a Public Switched Telephone Network (PSTN) (e.g., using a conference room equipment 130, a telephone, a cell phone, and the like) into the meeting, share files, relay instant messaging, relay video, and the like.

A user of computing device 105 and 110 may have an availability status which indicates their availability. Example availability statuses may be available, busy, do not disturb, be right back, and the like. In some examples, a new status may be created that may indicate that the user is not at a location where they are available for an in-person meeting. In some examples, the status may be called "working from home." It will be appreciated by one of ordinary skill in the art with the benefit of the present disclosure that other names may be utilized. The user may set the status using the communication application executing on their computing device (e.g., computing device 105, 110). This status may be kept locally on the computing device, or may be sent by the application, over the network 165 to an availability server 115 as an availability indication. Availability server 115 may store the availability status of the user as an availability data structure object in a database 120.

In some examples, the user may set their availability status in other ways, such as through an email client, a productivity application (e.g., a word processing program, a note taking program, or the like) or by accessing a website of the availability service over the network 165. In still other examples, the user's status may be automatically set by utilizing a geolocation (e.g., obtained through a Global Positioning System (GPS) in a computing device of a user such as a smartphone) of the user. For example, the system may update the user's availability to unavailable for in-person meetings when the user traverses beyond a geofence indicating an in-person meeting location. In other examples, the system may update the user's availability to unavailable for in-person meetings when the user enters a geofence (e.g., a geofence near a user's home, for example).

In some examples, upon setting an availability indication that indicates that the user is unavailable for in-person meetings, the availability service may communicate with a calendar server 135. For example, a user's calendar may be stored on a database 140 in communication with calendar server 135. The availability server 115 may interface with the calendar server 135 and search for in-person meeting data structure objects representing in-person meetings in a user's calendar for a period of time in which the user is unavailable for in-person meetings. For example, the availability service may search the user's calendar for all meeting data structure objects that describe meetings during the period of time.

A meeting data structure object is a data structure that describes a meeting and includes relevant metadata about the meeting such as a time of the meeting, a date of the meeting, meeting participants, resources (physical or remote meeting resources) associated with the meeting and the like. For meetings having meeting data structure objects with only physical resources, the availability server 115 may contact communications server 155 of communications service and schedule a remote meeting session for the time of the meeting and receive remote meeting connection information.

An availability data structure object is a data structure that may include a user's availability, a time period for the availability and a user identifier to identify a user. The user identifier may be linked to a user information data structure object that contains additional information about the user, such as a link to a calendar of the user, and the like. A remote meeting data structure object is a data structure that may include information about a remote meeting session such as resources, connection information, ownership information (e.g., which user created the meeting), participant information, and the like.

The availability server may synchronize the meeting data structure object on the calendar server 135 with the corresponding remote meeting data structure object by updating the meeting data structure object to include the remote meeting connection information. In some examples, the availability server 115 may instruct the calendar server 135 to notify one or more participants or the meeting organizer. In some examples, rather than automatically updating the meeting, the calendar server 135 may request permission from the meeting organizer to update the meeting.

As previously described the availability server 115 automatically adds remote meetings for in-person meetings during the period of time in which the user is unavailable to join an in-person meeting. The period of time may be predetermined based upon the status. For example, the status may be "I'm working from home today." In those examples the status is indicative that the time period is the current day. In some examples, multiple statuses indicative of multiple periods may be provided to the user. For example, in addition to working from home today, the system may have options for working from home this week, this month, this year, and the like. In some examples, the status may simply be "working from home," and the communications application may prompt the user for a time period.

Productivity application server 145 and database 150 may provide or assist in providing one or more productivity applications and may query availability server 115 of availability service to determine an availability status of the user. A productivity application that executes on, or partially on, a user's computing device (such as computing devices 105, 110) may utilize this availability status. Example productivity applications include Microsoft OFFICE® products including WORD®, POWERPOINT®, EXCEL®, VISIO®, OUTLOOK®, and the like. In some examples, the productivity application server 145 and the calendar server 135 may be a same server, such as an EXCHANGE® server. Conference room equipment 125, 130 may be computing devices and in some examples may be a tablet computing device, a VOIP device, a video camera, a telephone, and the like.

FIG. 1 described the availability server 115 processing the availability indication and interfacing with the calendar server 135 and the communications server 155 to add remote meeting information to in-person meetings of the user. In other examples, the computing device of the user, e.g., computing devices 105, 110 may perform those functions. For example, the computing device 105 may receive the availability indication from the user, search for meetings of the user (either on a calendar server 135 or locally), create remote meetings (e.g., by communicating with communications server 155), update the meetings, and the like. Similarly, the user's computing device may respond to availability information requests from other components of the system.

The functions of the various services of FIG. 1 are exemplary and functionality on one server may be performed on another server and the functionality of the various servers as described may be combined or divided into other servers. For example, the availability server 115 may be part of the communications server 155, productivity application server 145, and/or calendar server 135. In some examples, the process of automatically scheduling remote meeting resources and updating those meetings with the remote meeting connection information in response to a status indication from the user may be performed by the communications service, productivity application service, and/or calendar service.

Figure 2:
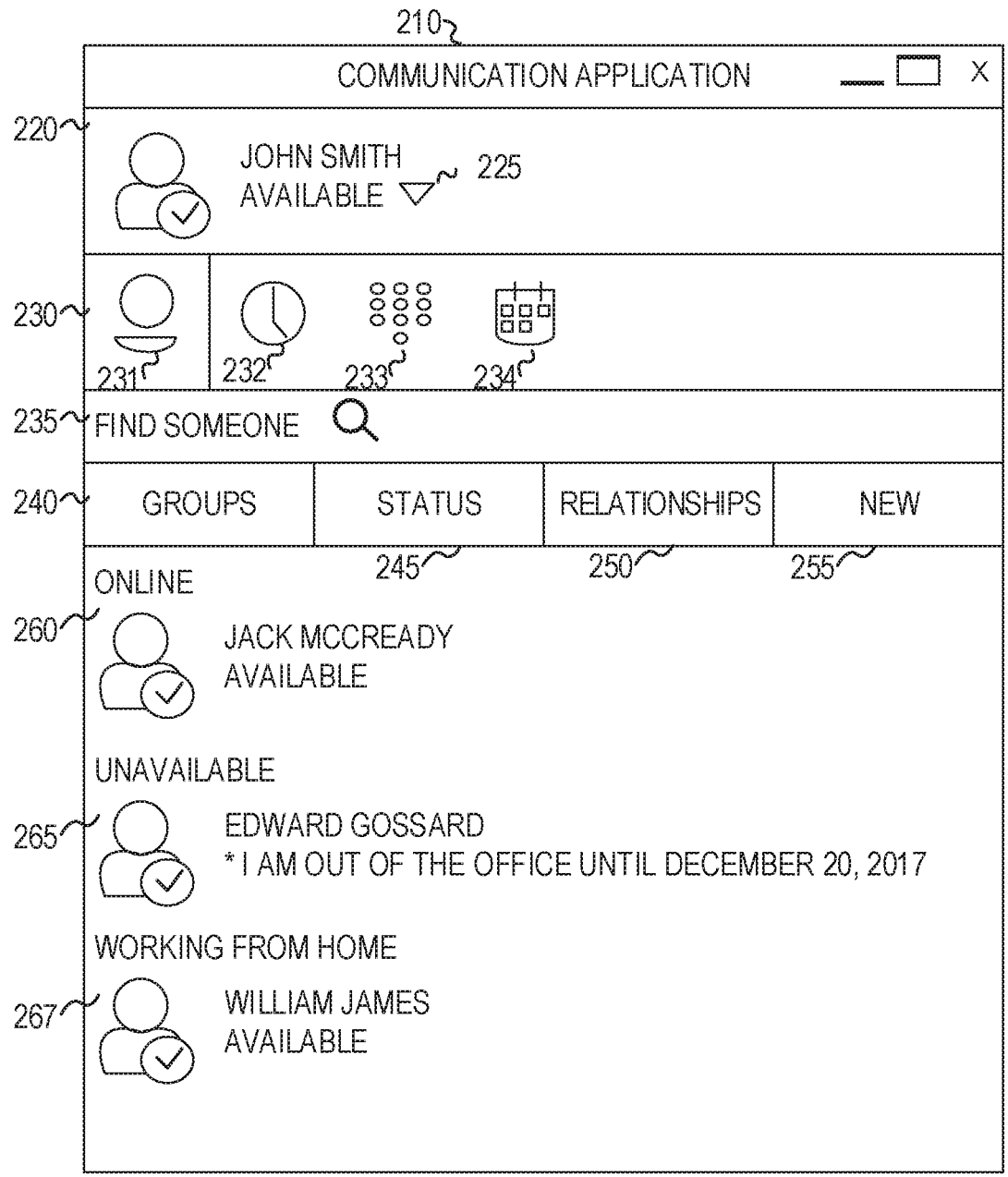
FIG. 2 illustrates a graphical user interface (GUI) of a communications application according to some examples of the present disclosure.
Figure 3:
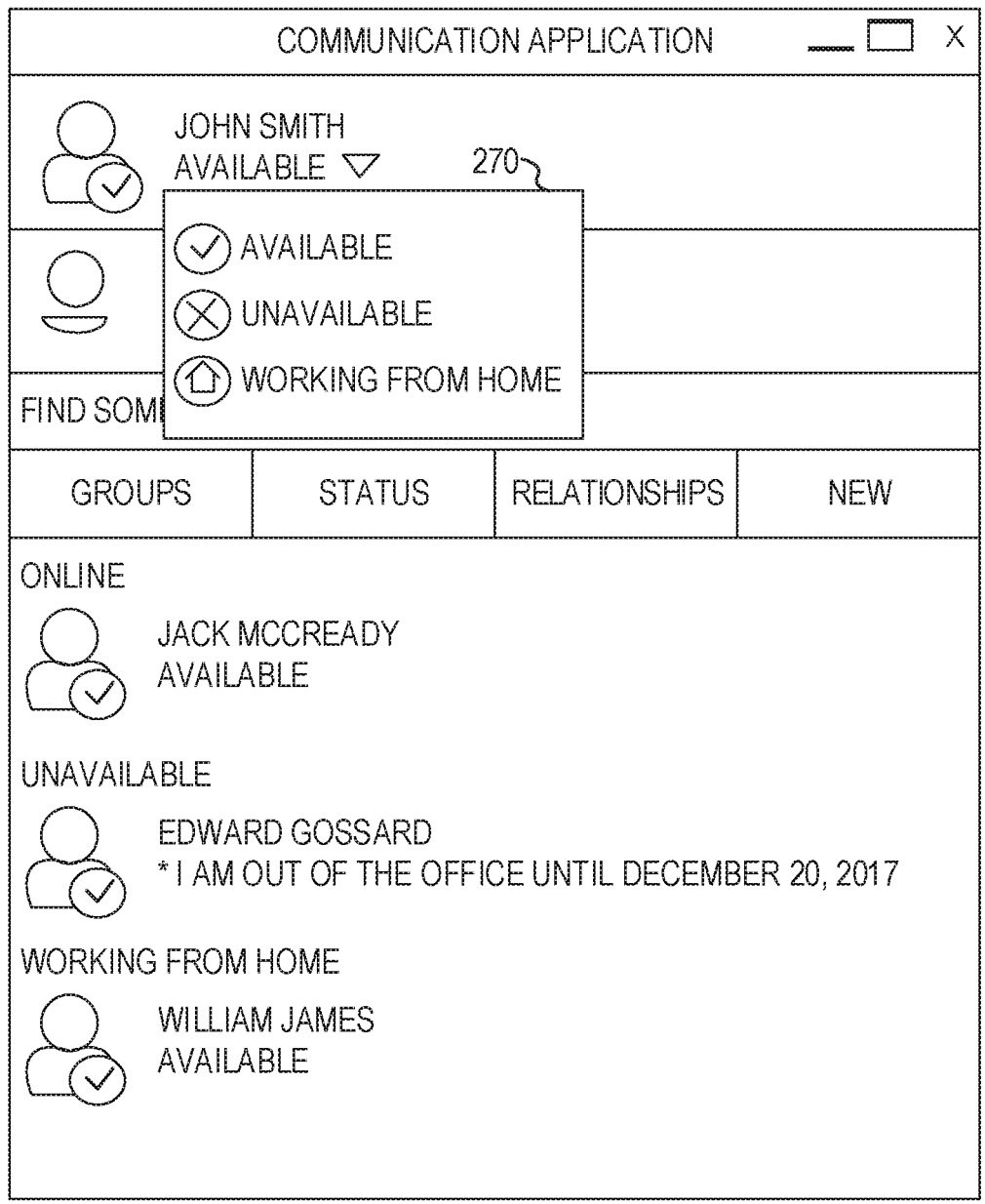
FIG. 3 illustrates a GUI showing an availability selection menu expanded after engagement of the drop down menu control according to some examples of the present disclosure.

FIG. 2 shows an example of a graphical user interface (GUI) 200 of a communications application according to some examples of the present disclosure. The GUI 200 is exemplary and other GUIs may be utilized. Title bar 210 gives the name of the communications application as well as window controls such as maximize, minimize, and close. Status bar 220 provides a thumbnail picture of the user, as well as an indication of the user's current availability status ("Available" in the example shown in FIG. 1). Drop down menu control 225 allows the user to call up a menu to change their status as shown in FIG. 3. Tab selector 230 allows the user to select between contacts (the first tab) 231, communications (e.g., calls) 232, a dialer (for initiating communications with others) 233, and a calendar 234. The contacts tab 231 is currently selected and as such, a user search box 235, a group sort sub-tab 240, status sort sub-tab 245, relationships sort sub-tab 250, and a new sort sub-tab 255 appear. Currently the status sort sub-tab is selected and a user's contacts may be shown grouped based upon their status. For example, Jack McCready 260 is online, Edward Gossard 265 is unavailable, and William James 267 is working from home. Groups sort sub-tab sorts the user's contacts based upon what group the user has assigned them. For example, a favorites group. Relationships sort sub-tab 250 may sort the user's contacts based upon whether they are friends and family, colleagues, blocked contacts, external contacts, and the like.

FIG. 3 shows an example of a graphical user interface (GUI) 300 which is the same GUI 200 of FIG. 2, but showing an availability selection menu 270 expanded after engagement of the drop-down menu control 225 according to some examples of the present disclosure. Availability selection menu 270 allows for the user to select from a plurality of statuses. FIG. 3 shows three statuses: available, unavailable, working from home, but other statuses may be utilized.

If the user selects an availability status different than their current status, the communication application may send an indication of the new status to the availability service which may then allow others to see the user's new availability status. In some examples, as noted above, if the user sets their availability status to "working from home" or to another status that indicates that the user is not at a particular location (e.g., work), the system may search the user's calendar and setup remote meetings for all in-person meetings that the system finds.

Figure 4:
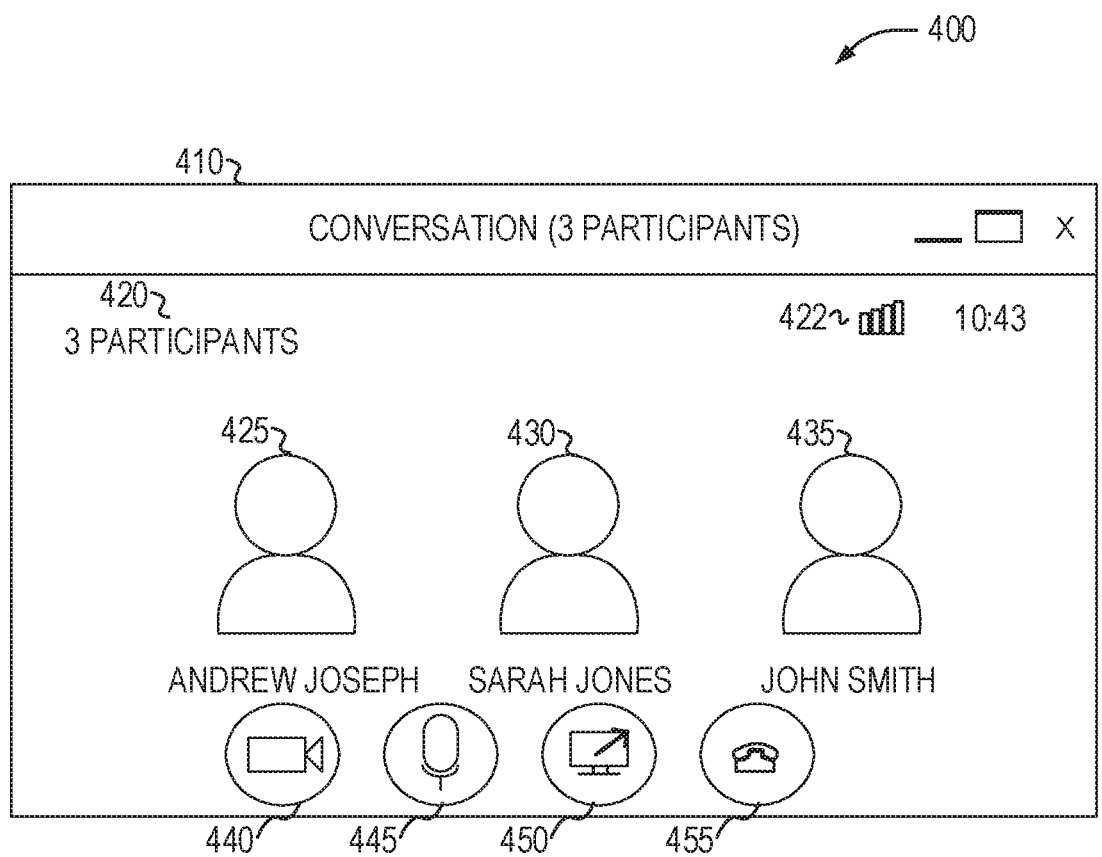
FIG. 4 illustrates an example GUI of a communications application during a remote meeting session according to some examples of the present disclosure.

FIG. 4 shows an example of a graphical user interface (GUI) 400 of a communications application during a remote meeting session according to some examples of the present disclosure. Title bar 410 shows a title of the conversation (just "conversation" in FIG. 4, but may be the meeting title) and the number of participants as well as window controls. Indicator 420 also shows the number of participants. Connection status 422 shows a connection strength and an elapsed time the connection has been active. Pictures from participants 425, 430, and 435 may be displayed. In some examples, an active speaker may be indicated. Button 440 may enable or disable video, button 445 may mute or unmute a microphone, button 450 may enable screen sharing, and button 455 may "hang up" the user from the remote meeting.

Figure 5:
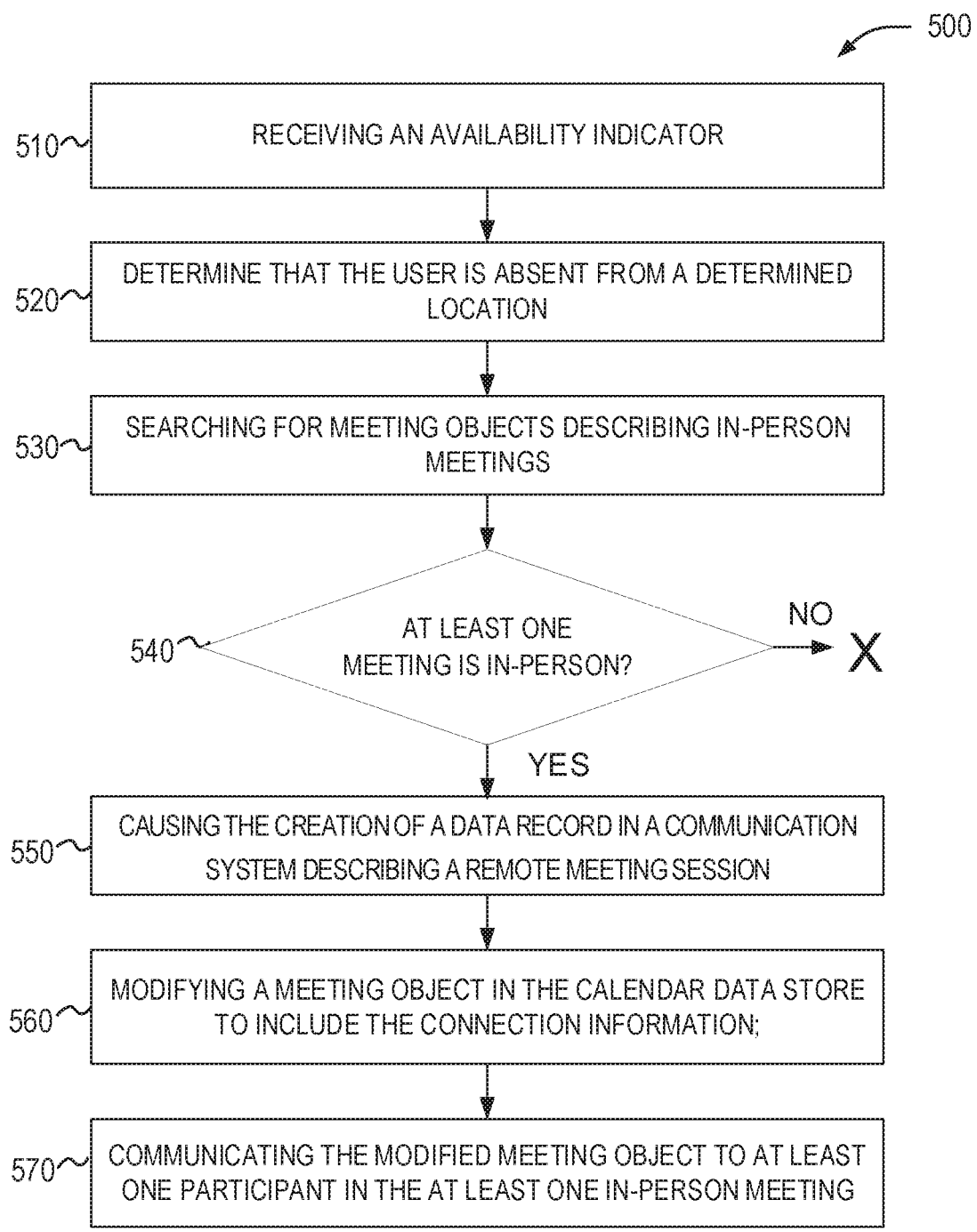
FIG. 5 shows a flowchart of a method of scheduling remote meetings in response to an indication that the user is not available for an in-person meeting according to some examples of the present disclosure.

FIG. 5 shows a flowchart of a method 500 of scheduling remote meetings in response to an indication that the user is not available for an in-person meeting. FIG. 5 may be performed all or in part by an availability server (e.g., availability server 115), but in other examples may be performed all or in part by a calendar server (e.g., calendar server 135), a productivity application server (e.g., productivity application server 145), a user's computing device (e.g., computing devices 105, 110), or a communications server (e.g., communications server 155).

At operation 510, the system may receive the availability indicator. The availability indicator may be an indication of an availability status of the user, such as available, not available, working from home, and the like. The indication may be entered or selected by the user from a communication application, an email application (e.g., by turning an out-of-office reply on or similar). The indication may have a corresponding time period with which the availability applies. In some examples, a geolocation determined by a computing device of the user may automatically determine the user's availability.

At operation 520 the system may determine that the availability status indicates that the user is absent from a determined location—for example, at home or otherwise unavailable for an in-person meeting. For example, the determined location may be a home. In other examples, the determined location may be anywhere except the user's office.

At operation 530, in response to determining that the availability status indicates that the user is absent from the determined location, the system may search for meeting data structure objects describing in-person meetings during the period the user is absent from the determined location. For example, the user may enter an amount of time that the user expects to maintain the status from operation 510 (such as through a GUI of the communications application). In other examples, the system may infer a particular duration (e.g., a day) or use a default duration. Operation 530 may be accomplished by interfacing with a calendar server to access the user's calendar, such as over a network using an application programming interface (API).

To determine whether a meeting is in-person or not, the system may examine resources reserved for the meeting that are described in the meeting data structure objects. If the meeting has no remote resources, the meeting may be classified as "in-person." Example physical resources may include conference rooms, projectors, televisions, computing devices, and the like. Example remote resource may include dial in numbers, remote meeting links, and the like. In some examples, the system may search the invitation text to identify remote meeting information as users may insert the dial in numbers or links into the meeting invitation text.

At operation 540, the system may determine if at least one meeting is an in-person meeting that is scheduled for the time period in which the user is away from a location of the meeting. If there are no in-person meetings for the time period, then processing stops. If there is at least one in-person meeting, then for one or more of the in-person meetings found, processing may continue with operations 550, 560, and 570.

At operation 550, the system causes the creation of a remote meeting data structure object in a communication system describing a remote meeting session—e.g., a remote meeting data structure object. That is, the system may create, with a communication system, a remote meeting for the time and duration of the meeting. The remote meeting data structure object may be stored in a storage device (e.g., a database) at the communications system and may describe the remote meeting. At operation 560 the system may modify the meeting data structure object in the calendar system to include information in the remote meeting data structure object such as the connection information. For example, the system may create a meeting update message that may include the connection information for the remote meeting session created at operation 550. At operation 570, the system may communicate the modified meeting data structure object to at least one meeting participant. For example, the meeting update may be sent to all participants. In some examples, the system may add one or more user interface controls in the meeting data structure object that allow users to click on the controls and automatically launch the remote meeting described by the remote meeting data structure object on their computing devices. Example controls may include a link, a button, an icon, or the like.

In some examples, rather than search meetings of a user in response to receiving the availability indicator, the system may search for in-person meetings and check attendee availability, and if attendees are not available for in-person meetings the system may create a remote meeting and update the in-person meeting with the remote meeting information.

As previously noted, the system may also analyze the physical resources of the meeting and determine if one or more changes may be necessary. For example, if the meeting seats seven, and the number of in-person attendees is now six, the system may attempt to reserve a conference room that seats six instead of seven. Likewise, if the conference room does not have sufficient computing resources to support a network meeting, then the system may find a conference room that seats the number of in-person attendees that has the requisite computing resources. The calendar system may store information on each conference room such as seating capacity, whether it is booked at particular times, and the audiovisual and computing capabilities. Furthermore, the system may instruct the computing devices of the conference room, over a network, on the connection information for the meeting. The conference room equipment may then automatically connect to the network meeting at the scheduled time.

Figure 6:
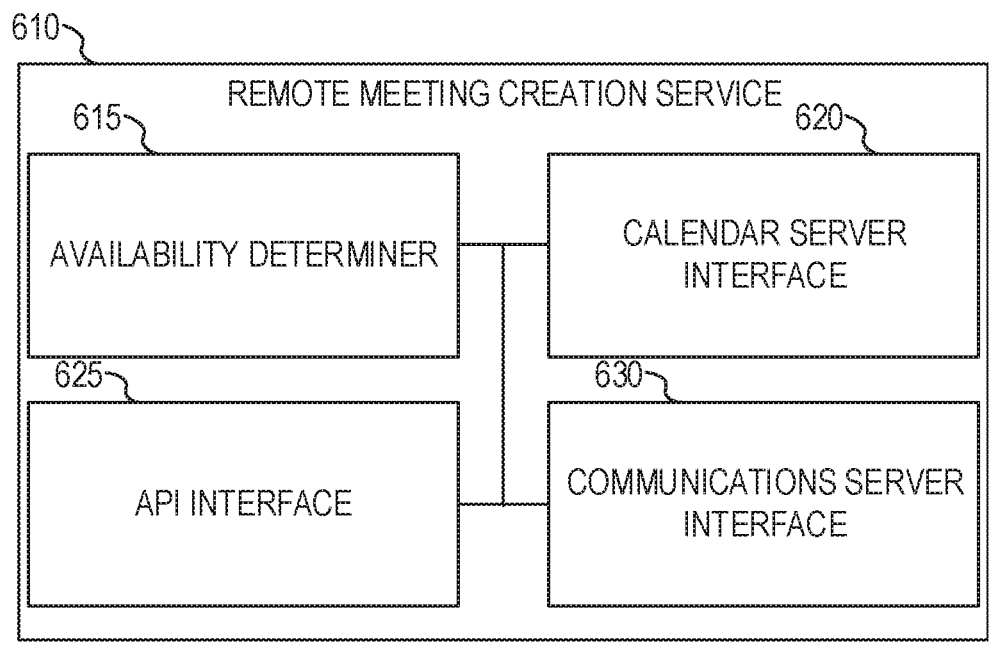
FIG. 6 illustrates a logical diagram of a remote meeting creation service according to some examples of the present disclosure.

Turning now to FIG. 6, a logical diagram of a remote meeting creation service 610 is shown according to some examples of the present disclosure. Remote meeting creation service 610 may execute on the availability server 115 of FIG. 1, 715 of FIG. 7. In other examples, remote meeting creation service 610 may execute on a computing device of a user (e.g., computing devices 105, 110), other servers, such as a communication server (e.g., communications server 155, 755), productivity application server (e.g., productivity application server 145), calendar server (such as calendar server 135,735), or a separate server. Remote meeting creation service 610 may, in response to a user changing their status to indicate that they are not available for the in-person meeting, create remote meetings for scheduled in-person meetings. For example, remote meeting creation service 610 may execute the method 500 of FIG. 5.

In some examples, availability determiner 615 may receive availability indications of a user. For example, the availability indications may be received from a user interface, a computing devices of the user and stored in a database (e.g., database 120,720), and the like. These indications may be received by a communications application that communicates with the availability service through an API provided by API interface 625. In other examples, the remote meeting creation service 610 may receive these indications from an availability server (in examples in which the remote meeting creation service 610 is not executing on the availability server). For example, the remote meeting creation service 610 may subscribe to updates to the user's availability status and the availability server may send notifications when the user's availability changes. In the examples in which the remote meeting creation service 610 is not executing on the availability server, the remote meeting creation service 610 may utilize the API component to communicate with the availability server.

API interface 625 may both provide an API for other applications to contact and communicate with the remote meeting creation service 610, but also be programmed with information on APIs of other applications, such as a calendar server, availability server, productivity applications server, communications server, conference room equipment, communications applications, and the like.

If an availability indication indicates that the user will be unavailable for in-person meetings (e.g., working from home), the remote meeting creation service 610 may utilize the calendar server interface 620 to communicate with a calendar server of the user (e.g., via the API component 625). The calendar server interface 620 may identify meetings of the user that are in-person meetings during a time frame that the user is unavailable for in-person meetings by examining remote meeting data structure objects associated with the user. Communications server interface 630 may communicate (e.g., via API component 625) with a communications server to create a remote meeting for one or more (or all) of the identified in-person meetings. Communications server interface 630 may then pass the remote meeting information to the calendar interface component which may cause the addition of the remote meeting information to the meeting. For example, the calendar server interface 620 may interface (e.g., through API interface 625) to update the meeting with the remote meeting connection information. In some examples, the calendar server interface 620 may contact the meeting organizer to request permission (e.g., either through a communications application or through an email application) to update the meeting.

Figure 7:
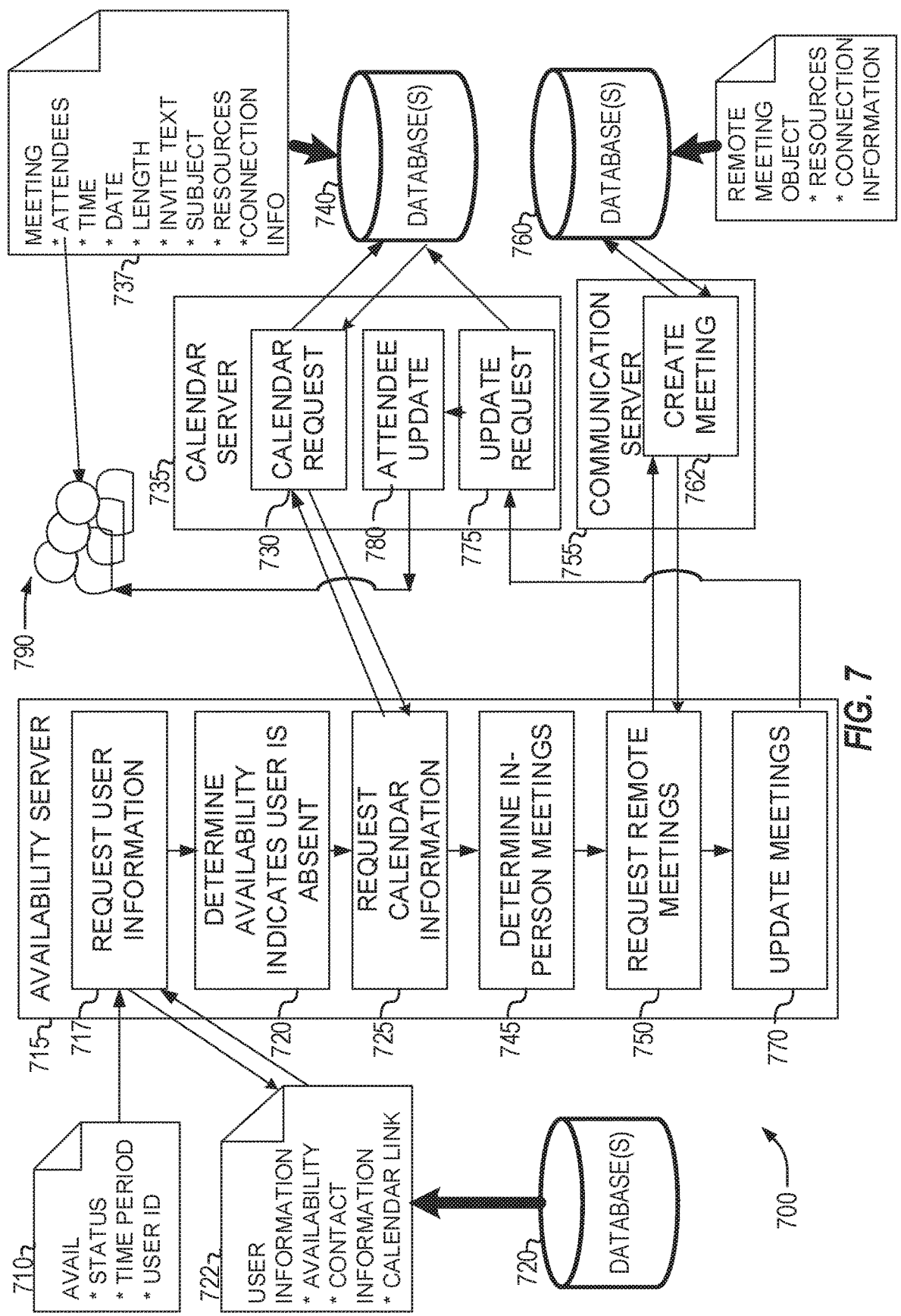
FIG. 7 illustrates a logical diagram of a data flow in the system, according to some examples of the present disclosure.

FIG. 7 shows an example data flow 700 in the system 100 according to some examples of the present disclosure. Availability server 715 may be an example of availability server 115 from FIG. 1. Database 720 may be an example of database 120 from FIG. 1. Calendar Server 735 may be an example of calendar server 135 of FIG. 1. Database 740 may be an example of database 140 of FIG. 1. Communication server 755 may be an example of communication server 155 of FIG. 1. Database 760 may be an example of database 160 of FIG. 1. In addition, remote meeting creation service 610 may be implemented on availability server 715, or other components of FIG. 7. The components of FIG. 6 may implement the operations of FIG. 7. In some examples, the computing device of the user may implement the functions shown for the availability server 715 in FIG. 7.

An availability status indication 710 may be a data structure object sent to, and received by the availability server 715 from a computing device of a user, a computer server (e.g., from the calendar server 735 or communication server 755, or the like), or the like. The availability status indication 710 may include status data (e.g., available, not available, working from home, and the like), time period data indicating a time period for which the status is effective for, a user identification for the user, and the like. In some examples, the time period is part of the status (e.g., I'm working from home today"). The availability status indication 710 may be packetized and sent across a computing network. The availability status indication 710 may be sent based upon a user changing their status on an application executing on a computing device of a user. In other examples, the availability status indication 710 may be sent based upon a user's computing device detecting a location of the user using a geolocation sensor. The availability server 715 may utilize the user identification in the availability status indication 710 to request user information at 717 such as a user information data structure object 722 in a database, such as database 720. The user information data structure object 722 may be stored in a database 720 of the availability server 715, or may be stored in a database of other components of FIG. 7.

The availability server may determine at 720 that the availability indicates that the user is absent from a determined location. For example, the availability status indicator 710 may indicate that the user is not at a particular location (e.g., not at a work location such as an office). The availability server may compare the status in the availability status indicator 710 to a list of statuses that indicates that the user is not at the particular location. In some examples, the statuses still indicate that the user is available for meetings, however, the user is not available for in-person meetings. Example such statuses include "working from home," "working from remote," "travelling," and the like.

At 725 the availability server may contact a calendar server associated with the user based upon a calendar link in the user information data structure object 722. For example, the calendar link may contain a network address or identifier of the calendar server 735. The availability server 715 may utilize an API to communicate with the calendar server 735 over a computer network at an address indicated by the calendar link. For example, the availability server 715 may format a request message according to the API to request the user's meeting data structure objects for the time period indicated in the availability status indication 710. The request may include the user's identification from the user information data structure object 722, the time period from the availability status indication 710, and security information indicating that the availability server 715 is authorized to access this information. The user may have previously given the availability server 715 authorized access to their calendar data. For example, the availability server 715 may have the user's username and password, may employ a single sign on, or OAUTH process.

The calendar server 735 may manage the user's calendar by storing meeting data structure objects for meetings for one or more users that correspond to meetings they have created or were invited to. The calendar server 735 may allow users to create meetings, send meeting requests, receive meeting requests, accept meeting requests, propose new times or modifications to meeting requests, view their calendar, and the like.

Meeting data structure objects 737 may be a data structure that describes a meeting and may include a list of attendees (e.g., user identifications of attendees), the time of the meeting, the length of the meeting, the date of the meeting, a string of text that indicates a subject, a string of text that indicates a message to participants, a list of resource data structure objects that identify resources, and in some examples connection information if it includes a remote meeting session. In some examples, the connection information may be part of the message to participants.

The calendar server 735 may receive and process the calendar request sent by the availability server 715 at 730. For example, the calendar server 735 may verify security credentials of the availability server (which may be in the user information data structure object 722, or obtained by the availability server 715) to ensure that the availability server 715 is authorized to access the user's calendar.

In some examples, the calendar server 735 searches for in-person meetings of the user by searching database 740 for meeting data structure objects for meetings occurring in the time period indicated in the availability status indication 710 that do not have connection information for a remote meeting (either in a separate data field, or in one of the other data fields) and returns all matching meeting data structure objects. Connection information may be searched for using a list of keywords ("dial in," "remote", and the like), detecting the characteristics of a phone number, links to known remote meeting communication servers, and the like. The calendar server may obtain the meeting status objects from database 740 using database query commands, such as a SELECT command.

In other examples, the calendar server 735 returns all meeting data structure objects for meetings occurring during the time period where the user is a participant and/or an organizer to the availability server 715, where the availability server 715 determines in-person meetings 745 in the same manner.

The availability server 715 may request the creation of one or more remote meeting sessions 750 for in-person meetings during the time period by interfacing with the communication server 755. For example, the availability server 715 may utilize information in the remote meeting data structure objects returned by calendar server 735 to request a remote meeting. The availability server 715 may send a request to create a remote meeting that is formatted according to an API and may include participant information, locale information (for dial-in numbers), computing equipment information (for computing resources), time information, duration information, and the like. Communication server 755 may receive the message, create the meeting data structure object 762 and store the meeting data structure object in the database 760. Remote meeting data structure objects may include information on the scheduled resources, connection information, participant information, and the like. This information is then provided back to availability server 715. In some examples, the availability server 715 may also send security information and the communication server 755 may verify this information.

Availability server 715 then updates the meetings at 770 by synchronizing the meeting data structure objects with the remote meeting data structure objects. For example, by submitting an update request 775, which then updates the meeting data structure object with the remote meeting information (e.g., connection information) in the remote meeting data structure object. The calendar server 735 may store the updated meeting data structure object in the database 740 and may update attendees 780 by sending update notifications to attendees 790 via email, push notifications to a communications application, text messages, or the like.

As used herein, a data structure object may be an instantiated instance of a data structure stored in a memory (volatile or non-volatile) storage device of a computing device. The data structure object may have one or more fields of data that hold values and are memory addressable.

Figure 8:
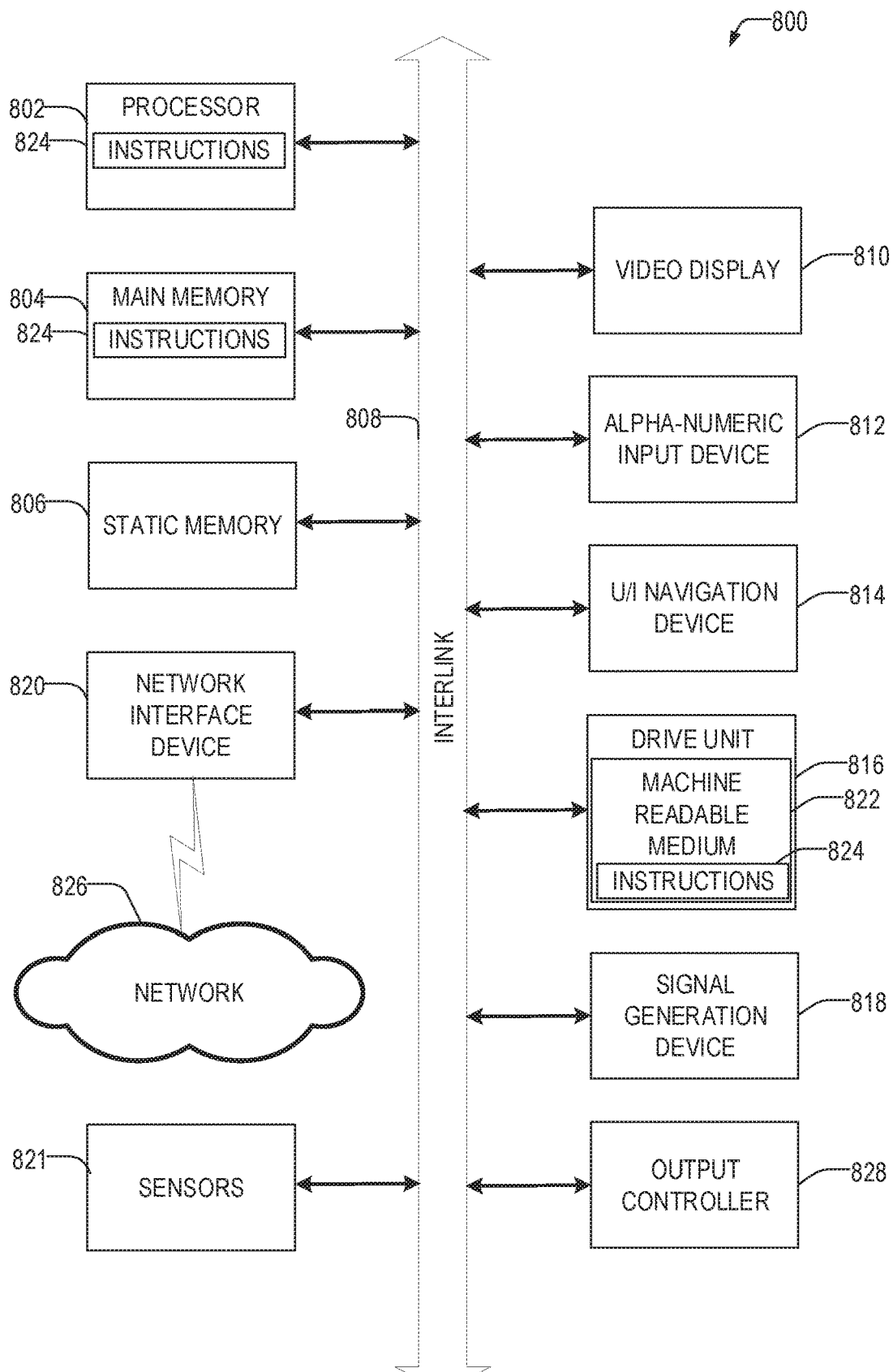
FIG. 8 illustrates a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 800 may implement, in whole or in part, the computing devices 105, 110, availability server 115, calendar server 135, productivity application server 145, communications server 155, conference room equipment 125, 130, and databases 140, 150, 160. Machine 800 may create, render, and/or display GUIs such as shown in FIGS. 2-4, perform the method of FIG. 5, and be configured with the components shown in FIG. 6 to implement the remote meeting creation service. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, interfaces, determiners, modules, or mechanisms (all referred to hereinafter as "modules"). For example, the components of FIG. 1, 6, 7. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a computing device, comprising: a processor; a memory, the memory comprising instructions, which when executed by the processor, cause the processor to perform operations comprising: determining whether an availability indication associated with a user is indicative of an absence of the user from a determined location for a period of time; if the availability indication is indicative of the absence of the user, interfacing with a data store and searching for meeting data structure objects describing meetings associated with the user during the period of time; determining, based upon the searching, whether the user is associated with at least one in-person meeting scheduled during the period of time; if the user is associated with at least one in-person meeting scheduled during the period of time, causing the creation of a remote meeting data structure object in a communication server, the remote meeting data structure object describing a remote meeting session at a time and date of the at least one in-person meeting, the remote meeting session including connection information; modifying a meeting data structure object in the calendar data store describing the at least one in-person meeting to include the connection information; and causing the modified meeting data structure object to be communicated to at least one participant in the at least one in-person meeting.

In Example 2, the subject matter of Example 1 optionally includes wherein the determined location is a work location of the user, and wherein the availability indication indicates that the user is working from home.

In Example 3, the subject matter of any one or more of Examples 1-2 optionally include wherein the operations of interfacing with the data store comprises communicating with a calendar server over the network using an API.

In Example 4, the subject matter of any one or more of Examples 1-3 optionally include wherein the operations of searching for meeting data structure objects describing meetings associated with the user and the period of time comprises: searching for meeting data structure objects including a physical resource reserved and wherein the meeting data structure object does not contain a reference to remote meeting session information.

In Example 5, the subject matter of any one or more of Examples 1-4 optionally include wherein the connection information comprises a dial-in-number.

In Example 6, the subject matter of any one or more of Examples 1-5 optionally include wherein the availability indication is received from a communications application executing on a computing device of the user, wherein the communications application includes at least one of: an email application, an instant messaging application, a voice communications application, or a video conferencing application.

In Example 7, the subject matter of any one or more of Examples 1-6 optionally include wherein the remote meeting session comprises one or more of: a teleconference capability, a screen-sharing session capability, a videoconference capability, a voice over Internet Protocol (VoIP) conference capability, or an instant messaging capability.

In Example 8, the subject matter of any one or more of Examples 1-7 optionally include wherein the operations comprise receiving a request over a network for a status of the user from a productivity application, and, in response, returning a message indicating that the user is absent from the determined location.

In Example 9, the subject matter of any one or more of Examples 1-8 optionally include wherein the operations comprise notifying an organizer of the at least one in-person meeting that the at least one in-person meeting has been updated with the connection information as a result of the availability indication.

In Example 10, the subject matter of any one or more of Examples 1-9 optionally include wherein modifying the meeting data structure object in the calendar data store describing the at least one in-person meeting to include the connection information comprises including an embedded control which, when activated establishes a connection from a computing device of a user to the communications server to connect the computing device of the user to the remote meeting session.

In Example 11, the subject matter of any one or more of Examples 1-10 optionally include wherein the communication server relays communications to and from participants in the remote meeting session.

Example 12 is a non-transitory machine-readable medium, comprising instructions, which when executed by a machine, causes the machine to perform operations comprising: determining whether an availability indication associated with a user is indicative of an absence of the user from a determined location for a period of time; if the availability indication is indicative of the absence of the user, interfacing with a data store and searching for meeting data structure objects describing meetings associated with the user during the period of time; determining, based upon the searching, whether the user is associated with at least one in-person meeting scheduled during the period of time; if the user is associated with at least one in-person meeting scheduled during the period of time, causing the creation of a remote meeting data structure object in a communication server, the remote meeting data structure object describing a remote meeting session at a time and date of the at least one in-person meeting, the remote meeting session including connection information; modifying a meeting data structure object in the calendar data store describing the at least one in-person meeting to include the connection information; and causing the modified meeting data structure object to be communicated to at least one participant in the at least one in-person meeting.

In Example 13, the subject matter of Example 12 optionally includes wherein the determined location is a work location of the user, and wherein the availability indication indicates that the user is working from home.

In Example 14, the subject matter of any one or more of Examples 2-13 optionally include wherein the operations of interfacing with the data store comprises communicating with a calendar server over the network using an API.

In Example 15, the subject matter of any one or more of Examples 12-14 optionally include wherein the operations of searching for meeting data structure objects describing in-person meetings associated with the user and the period of time comprises: searching for meeting data structure objects including a physical resource reserved and wherein the meeting data structure object does not contain a reference to remote meeting session information.

In Example 16, the subject matter of any one or more of Examples 12-15 optionally include wherein the connection information comprise a dial-in-number.

In Example 17, the subject matter of any one or more of Examples 12-16 optionally include wherein the availability indication is received from a communications application executing on a computing device of the user, wherein the communications application includes at least one of: an email application, an instant messaging application, a voice communications application, or a video conferencing application.

In Example 18, the subject matter of any one or more of Examples 12-17 optionally include wherein the remote meeting session comprises one or more of: a teleconference capability, a screen-sharing session capability, a videoconference capability, a voice over Internet Protocol (VoIP) conference capability, or an instant messaging capability.

In Example 19, the subject matter of any one or more of Examples 12-18 optionally include wherein the operations comprise receiving a request over a network for a status of the user from a productivity application, and, in response, returning a message indicating that the user is absent from the determined location.

In Example 20, the subject matter of any one or more of Examples 12-19 optionally include wherein the operations comprise notifying an organizer of the at least one in-person meeting that the at least one in-person meeting has been updated with the connection information as a result of the availability indication.

In Example 21, the subject matter of any one or more of Examples 12-20 optionally include wherein modifying the meeting data structure object in the data store describing the at least one in-person meeting to include the connection information comprises including an embedded control which, when activated establishes a connection from a computing device of a user to the communications server to connect the computing device of the user to the remote meeting session.

In Example 22, the subject matter of any one or more of Examples 12-21 optionally include wherein the communication server relays communications to and from participants in the remote meeting session.

Example 23 is a method comprising: at a computing device, performing operations comprising: determining whether an availability indication associated with a user is indicative of an absence of the user from a determined location for a period of time; if the availability indication is indicative of the absence of the user, interfacing with a data store and searching for meeting data structure objects describing meetings associated with the user during the period of time; determining, based upon the searching, whether the user is associated with at least one in-person meeting scheduled during the period of time; if the user is associated with at least one in-person meeting scheduled during the period of time, causing the creation of a remote meeting data structure object in a communication server, the remote meeting data structure object describing a remote meeting session at a time and date of the at least one in-person meeting, the remote meeting session including connection information; modifying a meeting data structure object in the calendar data store describing the at least one in-person meeting to include the connection information; and causing the modified meeting data structure object to be communicated to at least one participant in the at least one in-person meeting.

In Example 24, the subject matter of Example 23 optionally includes wherein the determined location is a work location of the user, and wherein the availability indication indicates that the user is working from home.

In Example 25, the subject matter of any one or more of Examples 23-24 optionally include wherein interfacing with the data store comprises communicating with a calendar server over the network using an API.

In Example 26, the subject matter of any one or more of Examples 23-25 optionally include wherein searching for meeting data structure objects describing meetings associated with the user and the period of time comprises: searching for meeting data structure objects including a physical resource reserved and wherein the meeting data structure object does not contain a reference to remote meeting session information.

In Example 27, the subject matter of any one or more of Examples 23-26 optionally include wherein the connection information comprise a dial-in-number.

In Example 28, the subject matter of any one or more of Examples 23-27 optionally include wherein the availability indication is received from a communications application executing on a computing device of the user, wherein the communications application includes at least one of: an email application, an instant messaging application, a voice communications application, or a video conferencing application.

In Example 29, the subject matter of any one or more of Examples 23-28 optionally include wherein the remote meeting session comprises one or more of: a teleconference capability, a screen-sharing session capability, a videoconference capability, a voice over Internet Protocol (VoIP) conference capability, or an instant messaging capability.

In Example 30, the subject matter of any one or more of Examples 23-29 optionally include wherein the method further comprises receiving a request over the network for a status of the user from a productivity application, and, in response, returning a message indicating that the user is absent from the determined location.

In Example 31, the subject matter of any one or more of Examples 23-30 optionally include wherein the method further comprises notifying an organizer of the at least one in-person meeting that the at least one in-person meeting has been updated with the connection information as a result of the availability indication.

In Example 32, the subject matter of any one or more of Examples 23-31 optionally include wherein modifying the meeting data structure object in the data store describing the at least one in-person meeting to include the connection information comprises including an embedded control which, when activated establishes a connection from a computing device of a user to the communications server to connect the computing device of the user to the remote meeting session.

In Example 33, the subject matter of any one or more of Examples 23-32 optionally include wherein the communication server relays communications to and from participants in the remote meeting session.

Example 34 is a device comprising: means for determining whether an availability indication associated with a user is indicative of an absence of the user from a determined location for a period of time; if the availability indication is indicative of the absence of the user, means for interfacing with a data store and means for searching for meeting data structure objects describing meetings associated with the user during the period of time; means for determining, based upon the searching, whether the user is associated with at least one in-person meeting scheduled during the period of time; if the user is associated with at least one in-person meeting scheduled during the period of time, means for causing the creation of a remote meeting data structure object in a communication server, the remote meeting data structure object describing a remote meeting session at a time and date of the at least one in-person meeting, the remote meeting session including connection information; means for modifying a meeting data structure object in the calendar data store describing the at least one in-person meeting to include the connection information; and means for causing the modified meeting data structure object to be communicated to at least one participant in the at least one in-person meeting.

In Example 35, the subject matter of Example 34 optionally includes wherein the determined location is a work location of the user, and wherein the availability indication indicates that the user is working from home.

In Example 36, the subject matter of any one or more of Examples 34-35 optionally include wherein the means for interfacing with the data store comprises means for communicating with a calendar server over the network using an API.

In Example 37, the subject matter of any one or more of Examples 34-36 optionally include wherein the means for searching for meeting data structure objects describing meetings associated with the user and the period of time comprises: means for searching for meeting data structure objects including a physical resource reserved and wherein the meeting data structure object does not contain a reference to remote meeting session information.

In Example 38, the subject matter of any one or more of Examples 34-37 optionally include wherein the connection information comprise a dial-in-number.

In Example 39, the subject matter of any one or more of Examples 34-38 optionally include wherein the availability indication is received from a communications application executing on a computing device of the user, wherein the communications application includes at least one of: an email application, an instant messaging application, a voice communications application, or a video conferencing application.

In Example 40, the subject matter of any one or more of Examples 34-39 optionally include wherein the remote meeting session comprises one or more of: a teleconference capability, a screen-sharing session capability, a videoconference capability, a voice over Internet Protocol (VoIP) conference capability, or an instant messaging capability.

In Example 41, the subject matter of any one or more of Examples 34-40 optionally include wherein the device further comprises means for receiving a request over the network for a status of the user from a productivity application, and, in response, means for returning a message indicating that the user is absent from the determined location.

In Example 42, the subject matter of any one or more of Examples 34-41 optionally include wherein the device further comprises means for notifying an organizer of the at least one in-person meeting that the at least one in-person meeting has been updated with the connection information as a result of the availability indication.

In Example 43, the subject matter of any one or more of Examples 34-42 optionally include wherein the means for modifying the meeting data structure object in the data store describing the at least one in-person meeting to include the connection information comprises means for including an embedded control which, when activated establishes a connection from a computing device of the user to the communications server to connect the computing device of the user to the remote meeting session.

In Example 44, the subject matter of any one or more of Examples 34-43 optionally include wherein the communication server relays communications to and from participants in the remote meeting session.

Example 45 is a computing device, comprising: a processor; a memory, the memory comprising instructions, which when executed by the processor, cause the processor to perform operations comprising: interfacing with a calendar data store and searching for meeting data structure objects; for at least one meeting data structure object, determining whether a meeting described by the at least one meeting data structure object is an in-person meeting and whether an availability status of a participant is indicative of an absence of the participant from a determined location, the absence from the determined location for a period of time including a time of the at least one meeting data structure object; if the meeting is an in-person meeting and if the availability status of the participant is indicative of the absence of the participant from the determined location, causing the creation of a remote meeting data structure object in a communication server, the remote meeting data structure object describing a remote meeting session at a time and date of the at least one meeting, the remote meeting session including connection information; modifying the at least one meeting data structure object in the calendar data store to include the connection information; and causing the modified meeting data structure object to be communicated to at least one other participant of the at least one meeting data structure object.

In Example 46, the subject matter of Example 45 optionally includes wherein the operations determining whether the meeting is an in-person meeting comprise: searching for meeting data structure objects including a physical resource reserved and wherein the meeting data structure object does not contain a reference to remote meeting session information.

In Example 47, the subject matter of any one or more of Examples 45-46 optionally include wherein the operations further comprise receiving an availability indication of the participant from a computing device of the participant.

In Example 48, the subject matter of any one or more of Examples 45-47 optionally include wherein the operations further comprise receiving an availability indication of the participant from the calendar data store.

In Example 49, the subject matter of any one or more of Examples 45-48 optionally include wherein the operations comprise receiving a request over a network for a status of the participant from a productivity application, and, in response, returning a message indicating that the participant is absent from the determined location.

In Example 50, the subject matter of any one or more of Examples 45-49 optionally include wherein modifying the at least one meeting data structure object in the calendar data store to include the connection information comprises including an embedded control which, when activated establishes a connection from a computing device of a user to the communications server to connect the computing device of the user to the remote meeting session.

In Example 51, the subject matter of any one or more of Examples 45-50 optionally include wherein the communication server relays communications to and from participants in the remote meeting session.

Example 52 is a non-transitory machine readable medium, comprising instructions, which when performed by a machine, causes the machine to perform operations comprising: interfacing with a calendar data store and searching for meeting data structure objects; for at least one meeting data structure object, determining whether a meeting described by the at least one meeting data structure object is an in-person meeting and whether an availability status of a participant is indicative of an absence of the participant from a determined location, the absence from the determined location for a period of time including a time of the at least one meeting data structure object; if the meeting is an in-person meeting and if the availability status of the participant is indicative of the absence of the participant from the determined location, causing the creation of a remote meeting data structure object in a communication server, the remote meeting data structure object describing a remote meeting session at a time and date of the at least one meeting, the remote meeting session including connection information; modifying the at least one meeting data structure object in the calendar data store to include the connection information; and causing the modified meeting data structure object to be communicated to at least one other participant of the at least one meeting data structure object.

In Example 53, the subject matter of Example 52 optionally includes wherein the operations determining whether the meeting is an in-person meeting comprise: searching for meeting data structure objects including a physical resource reserved and wherein the meeting data structure object does not contain a reference to remote meeting session information.

In Example 54, the subject matter of any one or more of Examples 52-53 optionally include wherein the operations further comprise receiving an availability indication of the participant from a computing device of the participant.

In Example 55, the subject matter of any one or more of Examples 52-54 optionally include wherein the operations further comprise receiving an availability indication of the participant from the calendar data store.

In Example 56, the subject matter of any one or more of Examples 52-55 optionally include wherein the operations comprise receiving a request over a network for a status of the participant from a productivity application, and, in response, returning a message indicating that the participant is absent from the determined location.

In Example 57, the subject matter of any one or more of Examples 52-56 optionally include wherein modifying the at least one meeting data structure object in the calendar data store to include the connection information comprises including an embedded control which, when activated establishes a connection from a computing device of a user to the communications server to connect the computing device of the user to the remote meeting session.

In Example 58, the subject matter of any one or more of Examples 52-57 optionally include wherein the communication server relays communications to and from participants in the remote meeting session.

Example 59 is a method comprising: at a computing device, performing operations comprising: interfacing with a calendar data store and searching for meeting data structure objects; for at least one meeting data structure object, determining whether a meeting described by the at least one meeting data structure object is an in-person meeting and whether an availability status of a participant is indicative of an absence of the participant from a determined location, the absence from the determined location for a period of time including a time of the at least one meeting data structure object; if the meeting is an in-person meeting and if the availability status of the participant is indicative of the absence of the participant from the determined location, causing the creation of a remote meeting data structure object in a communication server, the remote meeting data structure object describing a remote meeting session at a time and date of the at least one meeting, the remote meeting session including connection information; modifying the at least one meeting data structure object in the calendar data store to include the connection information; and causing the modified meeting data structure object to be communicated to at least one other participant of the at least one meeting data structure object.

In Example 60, the subject matter of Example 59 optionally includes wherein the operations determining whether the meeting is an in-person meeting comprise: searching for meeting data structure objects including a physical resource reserved and wherein the meeting data structure object does not contain a reference to remote meeting session information.

In Example 61, the subject matter of any one or more of Examples 59-60 optionally include wherein the operations further comprise receiving an availability indication of the participant from a computing device of the participant.

In Example 62, the subject matter of any one or more of Examples 59-61 optionally include wherein the operations further comprise receiving an availability indication of the participant from the calendar data store.

In Example 63, the subject matter of any one or more of Examples 59-62 optionally include wherein the operations comprise receiving a request over a network for a status of the participant from a productivity application, and, in response, returning a message indicating that the participant is absent from the determined location.

In Example 64, the subject matter of any one or more of Examples 59-63 optionally include wherein modifying the at least one meeting data structure object in the calendar data store to include the connection information comprises including an embedded control which, when activated establishes a connection from a computing device of a user to the communications server to connect the computing device of the user to the remote meeting session.

In Example 65, the subject matter of any one or more of Examples 59-64 optionally include wherein the communication server relays communications to and from participants in the remote meeting session.

Example 66 is a computing device comprising: means for interfacing with a calendar data store and searching for meeting data structure objects; for at least one meeting data structure object, means for determining whether a meeting described by the at least one meeting data structure object is an in-person meeting and whether an availability status of a participant is indicative of an absence of the participant from a determined location, the absence from the determined location for a period of time including a time of the at least one meeting data structure object; if the meeting is an in-person meeting and if the availability status of the participant is indicative of the absence of the participant from the determined location, means for causing the creation of a remote meeting data structure object in a communication server, the remote meeting data structure object describing a remote meeting session at a time and date of the at least one meeting, the remote meeting session including connection information; means for modifying the at least one meeting data structure object in the calendar data store to include the connection information; and means for causing the modified meeting data structure object to be communicated to at least one other participant of the at least one meeting data structure object.

In Example 67, the subject matter of Example 66 optionally includes wherein the means for determining whether the meeting is an in-person meeting comprise: means for searching for meeting data structure objects including a physical resource reserved and wherein the meeting data structure object does not contain a reference to remote meeting session information.

In Example 68, the subject matter of any one or more of Examples 66-67 optionally include wherein the device further comprises means for receiving an availability indication of the participant from a computing device of the participant.

In Example 69, the subject matter of any one or more of Examples 66-68 optionally include wherein the device further comprises means for receiving an availability indication of the participant from the calendar data store.

In Example 70, the subject matter of any one or more of Examples 66-69 optionally include wherein the device further comprises means for receiving a request over a network for a status of the participant from a productivity application, and, in response, returning a message indicating that the participant is absent from the determined location.

In Example 71, the subject matter of any one or more of Examples 66-70 optionally include wherein the means for modifying the at least one meeting data structure object in the calendar data store to include the connection information comprises means for including an embedded control which, when activated establishes a connection from a computing device of a user to the communications server to connect the computing device of the user to the remote meeting session.

In Example 72, the subject matter of any one or more of Examples 66-71 optionally include wherein the communication server relays communications to and from participants in the remote meeting session.

What is claimed is:

1. A computing device, comprising:
   a processor;
   a memory, the memory comprising instructions, which when executed by the processor, cause the processor to perform operations comprising:
   determining whether an availability indication associated with a user is indicative of a future absence of the user from a determined location for a period of time;
   responsive to determining that the availability indication is indicative of the absence of the user, interfacing with a data store comprising meeting data structure objects that are configured to describe in-person meetings and associated remote meetings and identifying a meeting data structure object that describes an in-person meeting that is associated with the user during the period of time; in person meeting being scheduled to occur after the determining whether an availability indication associated with a user is indicative of a future absence of the user;
   determining whether the in-person meeting described by the identified meeting data structure object is associated with a remote meeting by parsing the identified meeting data structure object to identify an indicator of the remote meeting;
   creating, in a communication server if the in-person meeting described by the identified meeting data structure object is not associated with a remote meeting, a remote meeting data structure object that is configured to provide remote access to a remote meeting session at a time and date of the in person meeting, the remote meeting data structure object comprising connection information that is configured to connect a remote device to the remote meeting session;
   updating or replacing, in the communication server, the identified meeting data structure object by modifying the identified meeting data structure object in the calendar data store to include the remote meeting data structure object; and causing the modified meeting data structure object to be communicated to at least one participant in the one in-person meeting.

2. The computing device of claim 1, wherein the operations of interfacing with the data store comprises communicating with a calendar server over the network using an API.

3. The computing device of claim 1, wherein the operations of parsing the identified meeting data structure object to identify an indicator of the remote meeting comprises:

parsing the identified meeting data structure object to identify connection information that is configured to connect one or more remote devices to the remote meeting session.

4. The computing device of claim 1, wherein the availability indication is received from a communications application executing on a computing device of the user, wherein the communications application includes at least one of: an email application, an instant messaging application, a voice communications application, or a video conferencing application.

5. The computing device of claim 1, wherein the operations comprise receiving a request over a network for a status of the user from a productivity application, and, in response, returning a message indicating that the user is absent from the determined location.

6. The computing device of claim 1, wherein the operations comprise notifying an organizer of the in person meeting that the in person meeting has been updated with the connection information as a result of the availability indication.

7. The computing device of claim 1, wherein modifying the identified meeting data structure object in the data store to include the remote meeting data structure object comprises modifying the identified meeting data structure object to include an embedded control which, when activated, establishes a connection between a computing device of a user to the communications server to connect the computing device of the user to the remote meeting session.

8. A method comprising:

a computing device, performing operations comprising:

determining whether an availability indication associated with a user is indicative of a future absence of the user from a determined location for a period of time;

responsive to determining that the availability indication is indicative of the absence of the user, interfacing with a data store comprising meeting data structure objects that are configured to describe in-person meetings and associated remote meetings and identifying a meeting data structure object that describes an in-person meeting that is associated with the user during the period of time;

determining whether the in-person meeting described by the identified meeting data structure object is associated with a remote meeting by parsing the identified meeting data structure object to identify an indicator of the remote meeting;

creating, in a communication server if the in-person meeting described by the identified meeting data structure object is not associated with a remote meeting, a remote meeting data structure object that is configured to provide remote access to a remote meeting session at a time and date of the in person meeting, the remote meeting data structure object comprising connection information that is configured to connect a remote device to the remote meeting session;

updating or replacing, in the communication server, the identified meeting data structure object by modifying the identified meeting data structure object in the calendar data store to include the remote meeting data structure object; and causing the modified meeting data structure object to be communicated to at least one participant in the in person meeting.

9. The method of claim 8, wherein interfacing with the data store comprises communicating with a calendar server over the network using an API.

10. The method of claim 8, wherein parsing the identified meeting data structure object to identify an indicator of the remote meeting comprises:

parsing the identified meeting data structure object to identify connection information that is configured to connect one or more remote devices to the remote meeting session.

11. The method of claim 8, wherein modifying the identified meeting data structure object in the data store to include the remote meeting data structure object comprises modifying the identified meeting data structure object to include an embedded control which, when activated, establishes a connection between a computing device of a user to the communications server to connect the computing device of the user to the remote meeting session.

12. The method of claim 8, wherein the communication server relays communications between participants in the remote meeting session.

13. A device comprising:

means for determining whether an availability indication associated with a user is indicative of a future absence of the user from a determined location for a period of time;

responsive to determining that the availability indication is indicative of the absence of the user, means for interfacing with a data store comprising meeting data structure objects that are configured to describe in-person meetings and associated remote meetings and means for identifying a meeting data structure object that describes an in-person meeting that is associated with the user during the period of time;

means for determining whether the in-person meeting described by the identified meeting data structure object is associated with a remote meeting by parsing the identified meeting data structure object to identify an indicator of the remote meeting;

means for creating, in a communication server if the in-person meeting described by the identified meeting data structure object is not associated with a remote meeting, a remote meeting data structure object that is configured to provide remote access to a remote meeting session at a time and date of the in person meeting, the remote meeting data structure object comprising connection information that is configured to connect a remote device to the remote meeting session;

means for updating or replacing, in the communication server, the identified meeting data structure object by for modifying the identified meeting data structure object in the calendar data store to include the remote meeting data structure object; and means for causing the modified meeting data structure object to be communicated to at least one participant in the in person meeting.

14. The device of claim 13, wherein the means for interfacing with the data store comprises means for communicating with a calendar server over the network using an API.

15. The device of claim 13, wherein the means for parsing the identified meeting data structure object to identify an indicator of the remote meeting comprises:
   means for parsing the identified meeting data structure object to identify connection information that is configured to connect one or more remote devices to the remote meeting session.

16. The device of claim 13, wherein the availability indication is received from a communications application executing on a computing device of the user, wherein the communications application includes at least one of: an email application, an instant messaging application, a voice communications application, or a video conferencing application.

17. The device of claim 13, wherein the device further comprises means for receiving a request over the network for a status of the user from a productivity application, and, in response, means for returning a message indicating that the user is absent from the determined location.

18. The device of claim 13, wherein the means for modifying the identified meeting data structure object in the data store to include the remote meeting data structure object comprises means for modifying the identified meeting data structure object to include an embedded control which, when activated establishes a connection between a computing device of the user to the communications server to connect the computing device of the user to the remote meeting session.

19. A computing device, comprising:
   a processor;
   a memory, the memory comprising instructions, which when executed by the processor, cause the processor to perform operations comprising:
   interfacing with a calendar data store and searching for meeting data structure objects;
   for at least one meeting data structure object, determining whether a meeting described by the at least one meeting data structure object is an in-person meeting and whether an availability status of a participant is indicative of an absence of the participant from a determined location, the absence from the determined location for a period of time including a time of the at least one meeting data structure object;
   if the meeting is an in-person meeting and if the availability status of the participant is indicative of the absence of the participant from the determined location, determining whether the in-person meeting described by the at least one meeting data structure object is associated with a remote meeting by parsing the at least one meeting data structure object to identify an indicator of the remote meeting;
   creating, in a communication server if the in-person meeting described by the at least one meeting data structure object is not associated with a remote meeting, a remote meeting data structure object that is configured to provide remote access to a remote meeting session at a time and date of the in person meeting, the remote meeting data structure object comprising connection information that is configured to connect a remote computing device to the remote meeting session;
   updating or replacing, in the communication server, the at least one meeting data structure object by modifying the at least one meeting data structure object in the calendar data store to include the remote meeting data structure object; and
   causing the modified meeting data structure object to be communicated to at least one other participant of the in-person meeting.

20. The computing device of claim 19, wherein the operations of determining whether the meeting is an in-person meeting comprise:
   parsing the at least one meeting data structure object to identify connection information that is configured to connect one or more remote devices to the remote meeting session.

21. The computing device of claim 19, wherein the operations further comprise receiving an availability indication of the participant from the calendar data store.

22. The computing device of claim 19, wherein modifying the at least one meeting data structure object in the calendar data store to include the remote meeting data structure object comprises modifying the at least one meeting data structure object to include an embedded control which, when activated establishes a connection from a computing device of a user to the communications server to connect the computing device of the user to the remote meeting session.

* * * * *

UNITED STATES PATENT AND TRADEMARK OFFICE
CERTIFICATE OF CORRECTION

PATENT NO. : 10,832,223 B2
APPLICATION NO. : 15/805899
DATED : November 10, 2020
INVENTOR(S) : Kumar et al.

Page 1 of 1

It is certified that error appears in the above-identified patent and that said Letters Patent is hereby corrected as shown below:

In the Claims

In Column 22, Line 48, in Claim 1, delete "in person" and insert --in-person-- therefor In Column 22, Line 62, in Claim 1, delete "in person" and insert --in-person-- therefor In Column 23, Line 31, in Claim 6, delete "in person" and insert --in-person-- therefor In Column 23, Line 32, in Claim 6, delete "in person" and insert --in-person-- therefor In Column 23, Line 66, in Claim 8, delete "in person" and insert --in-person-- therefor In Column 24, Lines 9-10, in Claim 8, delete "in person" and insert --in-person-- therefor In Column 24, Line 56, in Claim 13, delete "in person" and insert --in-person-- therefor In Column 24, Line 67, in Claim 13, delete "in person" and insert --in-person-- therefor In Column 26, Line 14, in Claim 19, delete "in person" and insert --in-person-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*